United States Patent
Miyata

(10) Patent No.: US 8,593,679 B2
(45) Date of Patent: Nov. 26, 2013

(54) POSITION-BASED IMAGE SCANNING, PROCESSING AND STORAGE

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 308 days.

(21) Appl. No.: 13/053,654

(22) Filed: Mar. 22, 2011

(65) Prior Publication Data

US 2011/0292457 A1    Dec. 1, 2011

(30) Foreign Application Priority Data

May 28, 2010  (JP) ................................. 2010-123313

(51) Int. Cl.
  *G06K 15/00*    (2006.01)
(52) U.S. Cl.
  USPC ........... 358/1.18; 358/1.9; 358/1.12; 358/505
(58) Field of Classification Search
  USPC .............. 358/1.9, 1.12, 1.16, 1.17, 1.18, 505, 358/403, 405; 382/305, 318
  See application file for complete search history.

(56) References Cited

U.S. PATENT DOCUMENTS

| 7,929,186 B2 | 4/2011 | Kubota et al. |
| 2004/0190025 A1 * | 9/2004 | Nomura et al. ................. 358/1.9 |
| 2007/0002400 A1 | 1/2007 | Kubota et al. |

FOREIGN PATENT DOCUMENTS

| JP | 07-093348 | 4/1995 |
| JP | 2001-076127 A | 3/2001 |
| JP | 2003-345817 | 12/2003 |
| JP | 2005-348171 A | 12/2005 |
| JP | 2007-013468 A | 1/2007 |

OTHER PUBLICATIONS

Notice of Reasons for Rejection issued in Japanese Application No. 2010-123313 mailed Aug. 20, 2013.

* cited by examiner

*Primary Examiner* — King Poon
*Assistant Examiner* — Jamares Q Washington
(74) *Attorney, Agent, or Firm* — Banner & Witcoff, Ltd.

(57) ABSTRACT

A scanning apparatus which scans a document, includes: a scanning section which includes a scanning area and which scans the document in the scanning area; a control device which includes a position information capturing section which captures a position information indicating a position of the document on the scanning area when the document is scanned by the scanning section and a processing section which performs a plurality of processes with respect to an image data of the document scanned by the scanning section based on the position information captured by the position information capturing section.

13 Claims, 17 Drawing Sheets

Fig. 11
| IMAGE | NUMBER | AREA | KEYWORD |
|---|---|---|---|
| 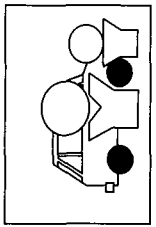 | 1 | TOP LEFT: 30%<br>BOTTOM LEFT: 70% | FATHER, BROTHER |
| 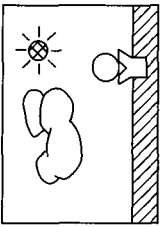 | 2 | TOP LEFT: 100% | FATHER |
| 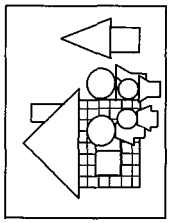 | 3 | TOP LEFT: 30%, TOP RIGHT: 45%<br>BOTTOM LEFT: 15%,<br>BOTTOM RIGHT: 10% | FATHER, MOTHER, BROTHER, SISTER |

Fig. 13

| FILE NAME | | | |
|---|---|---|---|
| TOP | Life | BOTTOM | Trip |
| KEYWORD | | | |
| LEFT | ADULT | RIGHT | CHILD |

| NUMBER | IMAGE | LEFT/RIGHT AREA | TOP/BOTTOM AREA | KEYWORD | FILE NAME |
|---|---|---|---|---|---|
| 1 | | LEFT:45%<br>RIGHT:55% | TOP:15%<br>BOTTOM:85% | ADULT, CHILD | Trip1.jpg |
| 2 | | LEFT:100%<br>RIGHT:0% | TOP:0%<br>BOTTOM:100% | ADULT | Trip2.jpg |
| 3 | | LEFT:20%<br>RIGHT:80% | TOP:100%<br>BOTTOM:0% | ADULT, CHILD | Life1.jpg |

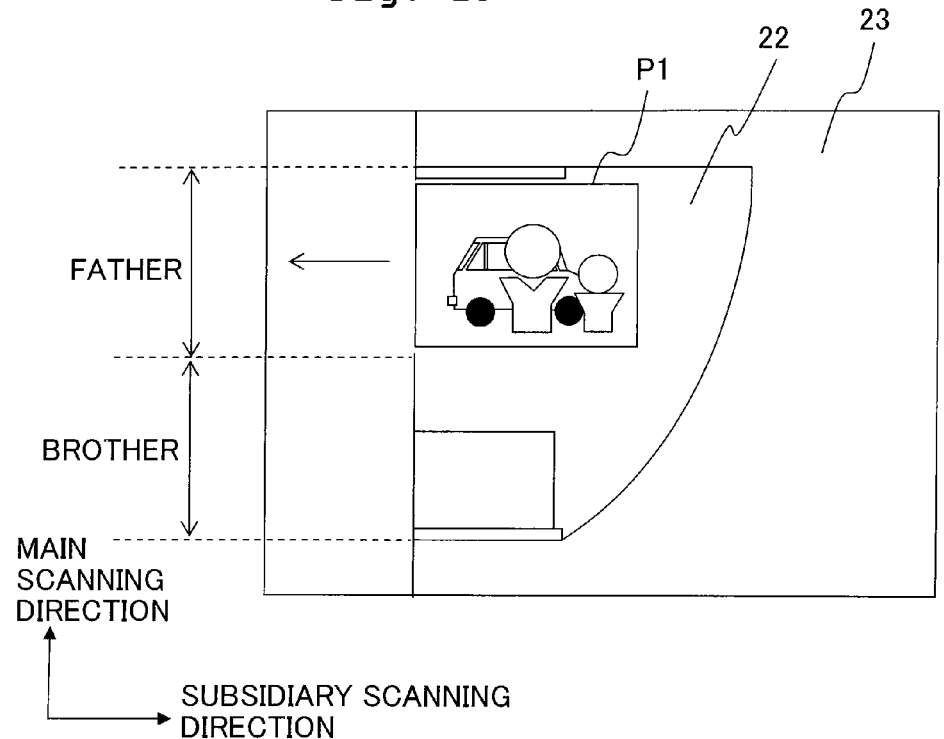
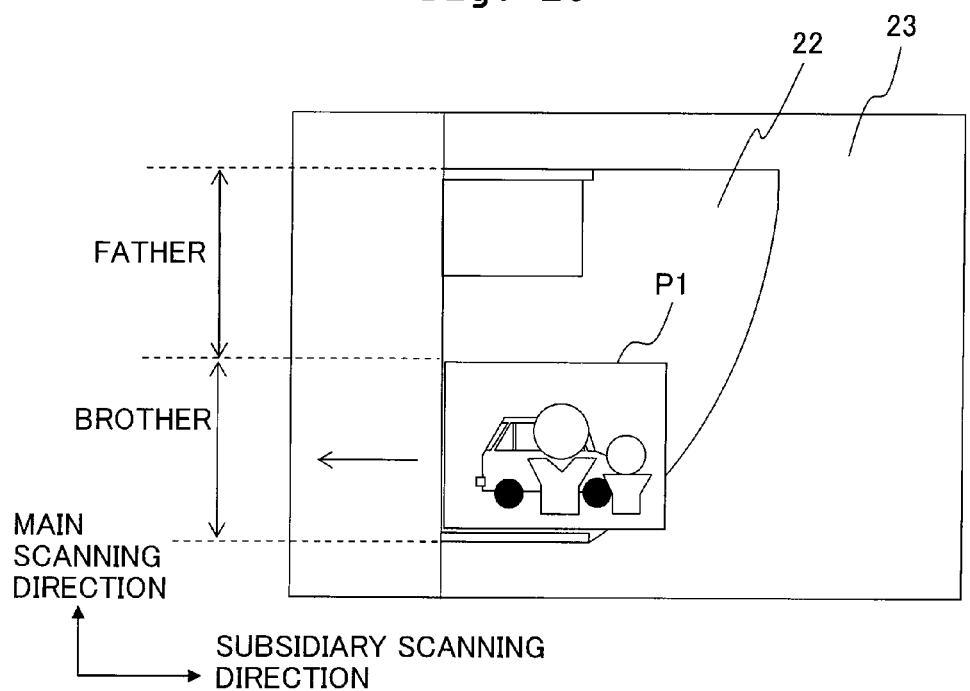

| KEYWORD | | FILE NAME | |
|---|---|---|---|
| TOP LEFT | ADULT | TOP RIGHT | Trip |
| FILE NAME | | KEYWORD | |
| BOTTOM LEFT | Life | BOTTOM RIGHT | CHILD |

OK

US 8,593,679 B2

POSITION-BASED IMAGE SCANNING, PROCESSING AND STORAGE

CROSS REFERENCE TO RELATED APPLICATION

The present application claims priority from Japanese Patent Application No. 2010-123313, filed on May 28, 2010, the disclosure of which is incorporated herein by reference in its entirety.

BACKGROUND OF THE INVENTION

1. Field of the Invention

The present invention relates to an image scanning apparatus, an information processing apparatus, a program and a scanning system which add a plurality of pieces of information to scanned image data.

2. Description of the Related Art

In a conventional electronic filing apparatus which optically scans a drawing, a document, etc., and stores scanned image data into a recording medium such as an optical disc, when the scanned image data are stored into the recording medium, titles and/or search keywords of the scanned image data are previously registered to make a database thereof so as to quickly search an image data desired to be found from the image data stored in the recording medium. For example, Japanese Patent Application Laid-open No.H07-93348 suggests an image information processing apparatus which includes: a scanning means which scans an image information from a document; a character recognition means which recognizes characters positioned at a portion corresponding to a predetermined position of the document, from the image information scanned by the scanning means; and a storage means which stores a scanned image information associated with the character recognized by the character recognition means, and titles and/or search keywords for searching desired image information can be registered.

SUMMARY OF THE INVENTION

As in the image information processing apparatus described in the Japanese Patent Application Laid-open No. H07-93348, a technique, in which a piece of information is added to a scanned image data, has been publicly known. However, a technique, in which the information is added to the image data more easily, is expected. The present invention provides a technique in which a keyword etc. is added to the scanned image data and which is different from the technique described in the Japanese Patent Application Laid-open No.H07-93348.

According to a first aspect of the present invention, there is provided a scanning apparatus which scans a document, including: a scanning section which includes a scanning area and which scans the document in the scanning area; a control device which includes a position information capturing section which captures a position information indicating a position of the document on the scanning area when the document is scanned by the scanning section and a processing section which performs a plurality of processes with respect to an image data of the document scanned by the scanning section based on the position information captured by the position information capturing section.

According to a second aspect of the present invention, there is provided an information processing apparatus which is connectable to a scanning apparatus including a scanning section which includes a scanning area and which scans the document in the scanning area, the information processing apparatus including: a control device which includes a position information capturing section which captures a position information indicating a position of the document on the scanning area when the document is scanned by the scanning section and a processing section which performs a plurality of processes with respect to an image data of the document scanned by the scanning section based on the position information captured by the position information capturing section.

According to a third aspect of the present invention, there is provided a program which allows an information processing apparatus, which is connectable to a scanning apparatus including a scanning section which includes a scanning area and which scans the document in the scanning area, to execute steps, the steps including: capturing a position information indicating a position of the document on the scanning area when the document is scanned by the scanning section; and performing a plurality of processes with respect to an image data of the document scanned by the scanning section based on the position information.

According to a fourth aspect of the present invention, there is provided a scanning system in which an information processing apparatus is connected to a scanning apparatus including a scanning section which includes a scanning area and which scans the document in the scanning area, the scanning system including: a control device which includes a position information capturing section which captures a position information indicating a position of the document on the scanning area when the document is scanned by the scanning section and a processing section which performs a plurality of processes with respect to an image data of the document scanned by the scanning section based on the position information captured by the position information capturing section.

According to the scanning apparatus, the information processing apparatus, the program, and the scanning system of the first to fourth aspects of the present invention, a process is performed depending on a position information indicating a position of the document, scanned by the scanning section of the scanning apparatus, in the scanning area. Thus, the user is capable of easily performing desired processes with respect to the image data of the document.

BRIEF DESCRIPTION OF THE DRAWINGS

FIG. 11 shows a data list associated with a plurality of image data in the first embodiment.

FIG. 13 shows an example of a setting screen for setting keywords and file names in a second embodiment.

FIG. 16 shows a data list associated with a plurality of pieces of image data in the second embodiment.

FIG. 19 shows a position of the picture P1 placed at an upper position in a main scanning direction of a document tray with respect to divided scanning areas in the third embodiment.

FIG. 20 shows a position of the picture P1 placed at a lower position in the main scanning direction of the document tray with respect to the divided scanning areas in the third embodiment.

DESCRIPTION OF THE PREFERRED EMBODIMENTS

An explanation will be made below in detail with reference to the accompanying drawings about embodiments in which an image scanning apparatus according to the present invention is embodied. The embodiments described below are embodiments in which the prevent invention is applied to a multifunction machine having a scanner function, a printer function, a copy function, a facsimile function, etc.

Figure 1:
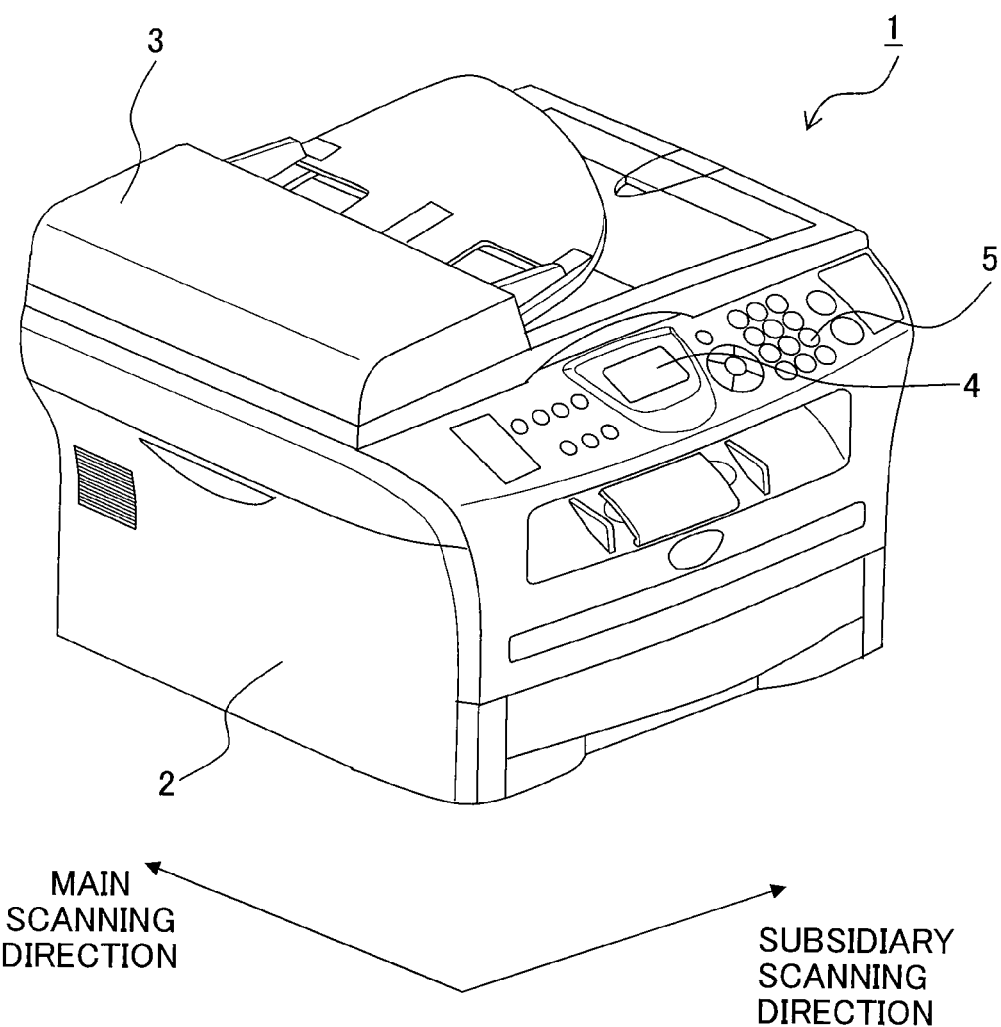
FIG. 1 shows an exterior appearance of a multifunction machine to which the present invention is applied.

First, a first embodiment of an image forming apparatus of the present invention will be described. As shown in FIG. 1, a multifunction machine 1 of this embodiment is provided with a main body portion 2, in which an image forming section 38 which prints an image onto a paper is provided, a scanner section 3 (an example of a scanning apparatus of the present invention) which scans the image of a document. As an image forming type of the multifunction machine 1, it is allowable to use an electro-photographic type or an ink jet type. Further, it is allowable that the multifunction machine 1 forms a monochrome (black and white) image only or a color image.

The scanner section 3 is provided with an operation panel 5 having a display section 4 such as a liquid crystal display, various buttons, etc., at a front surface side thereof. A user is capable of checking an operation state by the display section 4 and performing various input operations via the operation panel 5.

Figure 2:
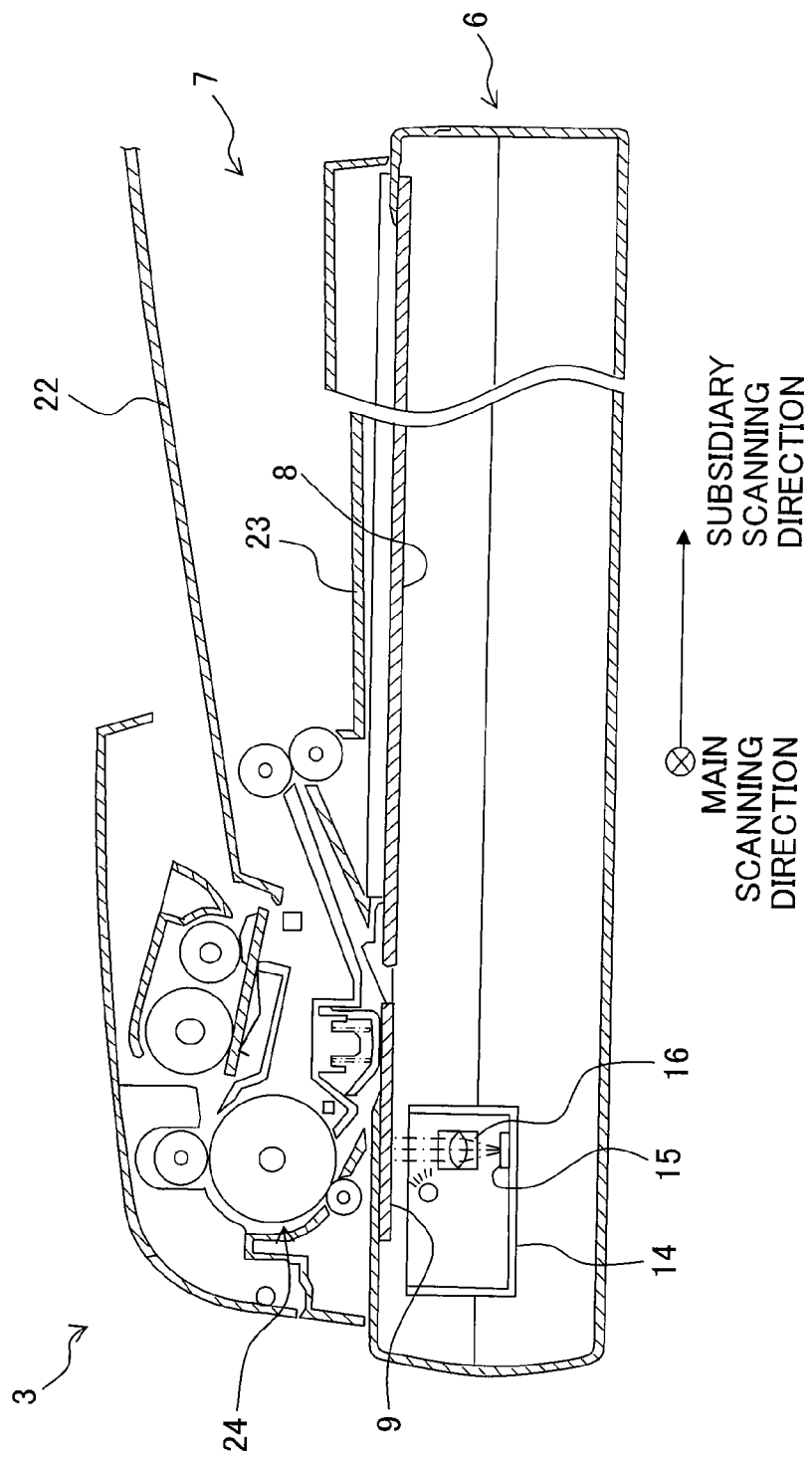
FIG. 2 is a cross-sectional view showing a structure of a scanner section of the multifunction machine.

As shown in FIG. 2, the scanner section 3 is provided with a image scanning section 6 (an example of an scanning section of the present invention) which scans the image of the document and an ADF (Auto Document Feeder) 7 which is provided in an openable/closable manner to cover above the image scanning section 6 and feeds the document automatically. The image scanning section 6 is provided with two transparent platen glasses 8 and 9 (scanning areas) which are positioned on an upper surface of the image scanning section 6 and an image sensor 14 which is positioned inside the image scanning section 6.

The image sensor 14 is a CIS (Contact Image Sensor) type sensor and is provided with an CMOS image pickup element 15, an optical element 16 constructed of a lens, and a light source (not shown) constructed of an RGB light emitting diode. The CMOS image pickup element 15 is constructed of a plurality of photo diodes aligned in a row in a main scanning direction (refer to FIG. 5). The CMOS image pickup element 15 receives a reflected light generated when a light is emitted to illuminate the document by the light source via the optical element 16, converts a light intensity (luminosity) of the reflected light into an electrical signal for each pixel, and outputs the electrical signal.

The ADF 7 is provided with a document tray 22 on which a document to be scanned is placed and a discharge tray 23 on which a scanned document is placed. The document tray 22 is arranged above the discharge tray 23. Further, a feeding passage 24, which connects the document tray 22 to the discharge tray 23, is provided inside the ADF 7. The ADF 7 takes documents placed on the document tray 22 one-by-one and feeds each of the documents to a position facing the platen glass 9 (hereinafter referred to as a "ADF glass 9"). Then, each of the documents is discharged on the discharge tray 23.

As a document scanning type, a flatbed (stationary document scanning) type or an ADF (moving document scanning) type is used. In a case of the flatbed type, the document is placed on the platen glass 8 (hereinafter referred to as a "FB glass 8"). In this state, the image sensor 14 is moved in a subsidiary scanning direction (a direction perpendicular to the main scanning direction, left right direction in FIG. 2). During this movement, the image of the document is scanned by every one line in the main scanning direction. On the other hand, in a case of the ADF type, all the documents to be scanned are placed on the document tray 22. The image sensor 14 is moved to the position facing the ADF glass 9 and fixed. In this state, each of the documents is fed to the position facing the ADF glass 9. During this feeding process, the image of the document is scanned by every one line in the main scanning direction.

Figure 3:
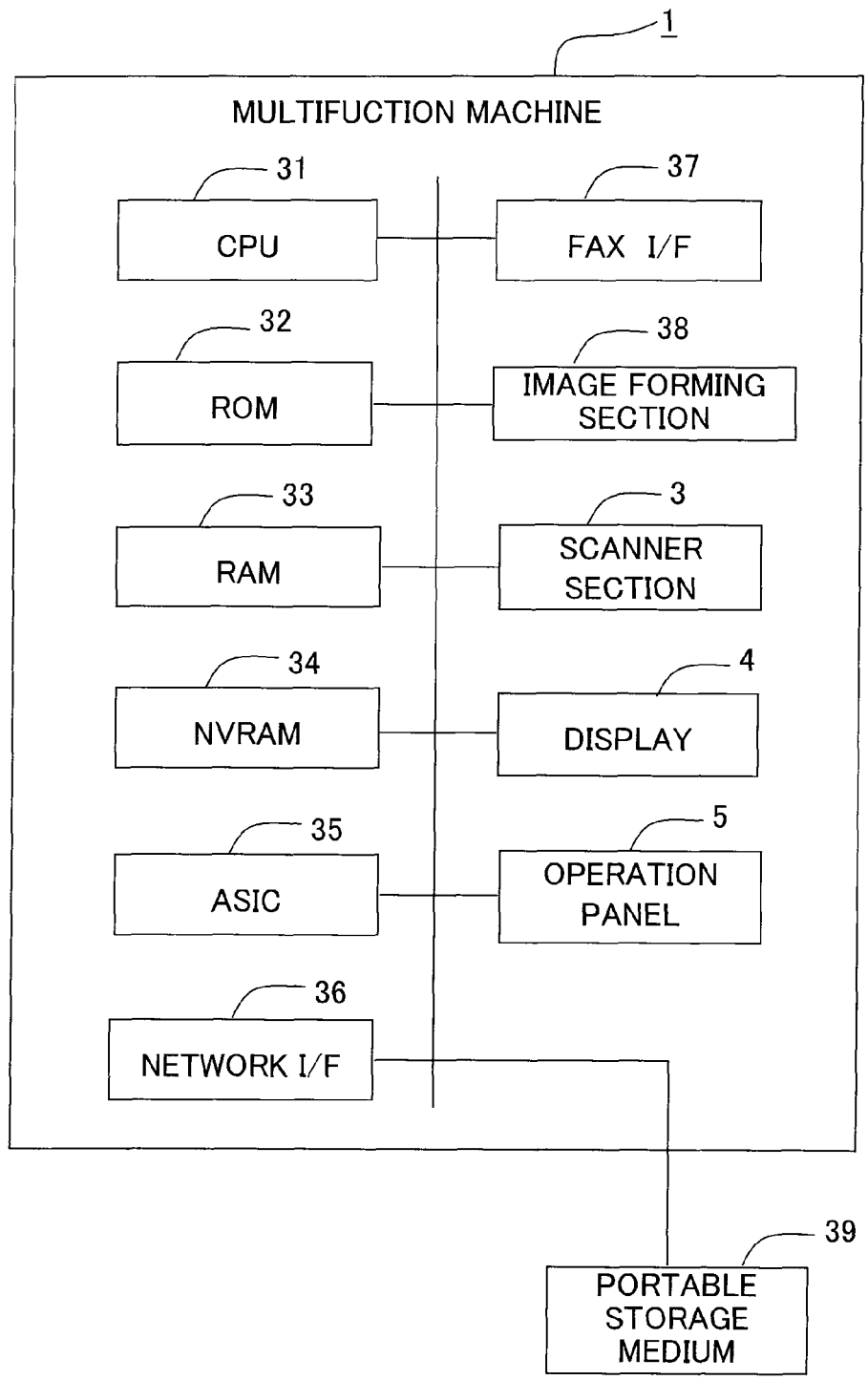
FIG. 3 is a block diagram showing an electrical structure of the multifunction machine to which the present invention is applied.

Next, an electrical structure of the multifunction machine 1 will be described. As shown in FIG. 3, the multifunction machine 1 has a control device 30 including a CPU 31 (an example of a position information capturing section, a processing section, an adding section, an area judgment section, a measuring section, and a selecting section of the present invention), a ROM 32, a RAM 33, a NVRAM 34, a ASIC 35, a network interface (network I/F) 36, a facsimile interface (FAX I/F) 37, an image forming section 38, and a portable storage medium 39.

The ROM 32 stores a user interface (UI) by which the user previously set keywords used for search etc., various control programs and various settings for controlling the multifunction machine 1, an initial value, etc. The RAM 33 and/or the NVRAM 34 is/are utilized as a work area at which the various control programs are read or as a storage area which stores a counter i which counts the number of the image data, the keywords set by the UI, etc. A method for setting the keywords etc. will be described in detail later.

The ASIC 35 is electrically connected to the image forming section 38, the scanner section 3, the operation panel 5, etc. The CPU 31 controls each component of the multifunction machine 1 (for example, a drive motor (not shown) of various rollers constructing the feeding passage 24 of the ADF 7 and a motor for moving the image sensor 14 (not shown)) via the ASIC 35, while storing, in the RAM 33 or the NVRAM 34, a processing result processed in accordance with the control program read from the ROM 32.

The network I/F 36 is connected to an information device and thus it is possible to perform a data communication between the multifunction machine 1 and the information device via the network I/F 36. Further, a FAX I/F 37 is connected to a telephone line and thus it is possible to perform a data communication between the multifunction machine 1 and an external facsimile apparatus etc. via the FAX I/F 37.

The multifunction machine 1 is capable of being connected to the portable storage medium 39. The image data to which the keywords etc. are added are stored in the portable storage medium, such as a USB memory device and/or a SD card.

Next, a method by which keywords which are used, for example, to search a piece of scanned image data are set in a plurality of divided scanning areas on the FB glass 8 respectively will be described. The multifunction machine 1 is connected to a personal computer (PC, not shown) via the network I/F 36. The CPU 31 reads the UI shown in FIG. 4 stored in the ROM 32, and sends it to the PC via the network I/F 36. Then, the UI is displayed on a display (not shown) of the PC. The user operates an input means of the PC, such as a keyboard (not shown), on this setting UI, to input the keyword in each of the scanning areas.

Figure 4:
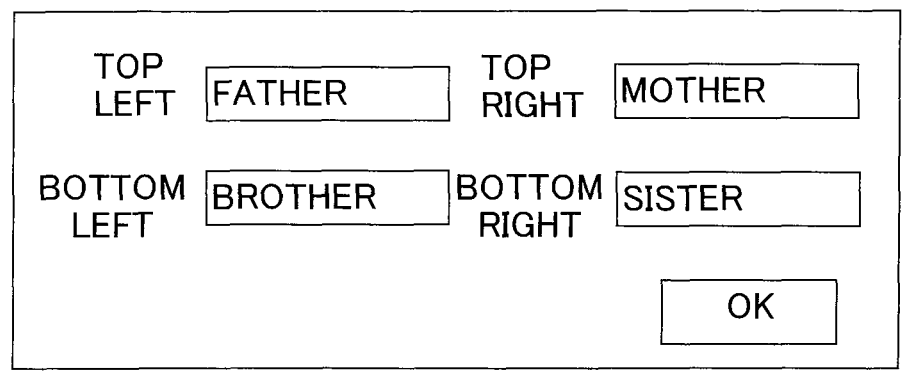
FIG. 4 shows an example of a keyword setting screen in a first embodiment.

For example, the user inputs keywords in a keyword setting screen shown in FIG. 4 via the input means of the PC, such as the key board, and presses an "OK" button. Then, the CPU 31 associates the keywords of "father", "mother", "brother", and "sister" with an upper left scanning area, an upper right scanning area, a lower left scanning area, and a lower right scanning area on the FB glass 8, respectively, to store relationships between position information of the scanning areas and the keywords associated with the plurality pieces of position information in the RAM 33 via the network I/F 36.

Figure 5:
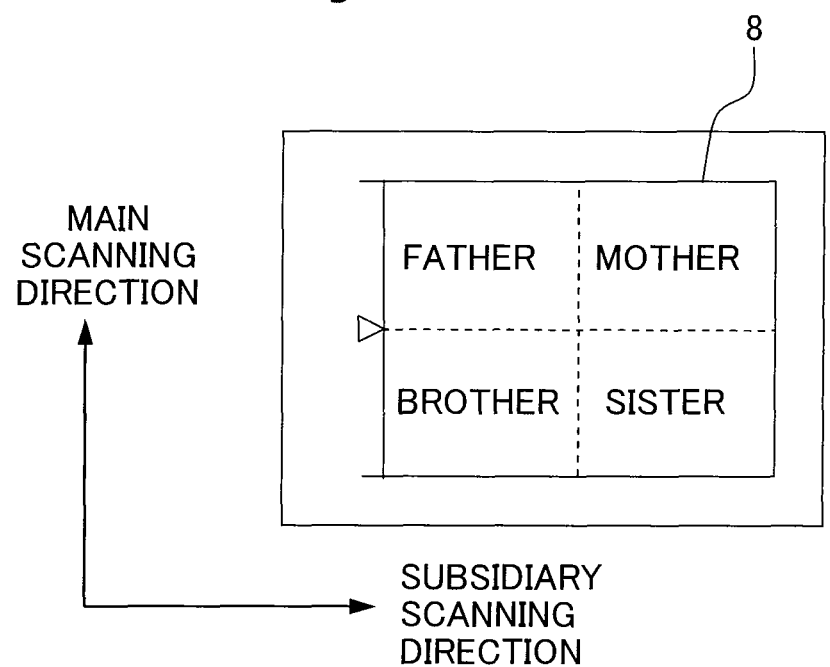
FIG. 5 conceptually shows a state in which keywords are respectively set in divided scanning areas in the first embodiment.

As shown in a conceptual diagram of FIG. 5, a scanning area on the FB glass 8 is divided into two scanning areas (shown by the dotted line) in the main scanning direction (a longitudinal direction in FIG. 5) and is divided into two scanning areas (shown by the dotted line) in the subsidiary scanning direction (a lateral direction in FIG. 5). Thus, the scanning area on the FB glass 8 is divided into four scanning areas (divided scanning areas). The CPU 31 sets the keywords in the four scanning areas (an example of a document scanning area of the present invention), respectively, based on associations between the keywords and the plurality of position information of the scanning areas, which is stored in the RAM 33. In particular, the keyword "father", the keyword "mother", the keyword "brother", and the keyword "sister" are set in the upper left scanning area, the upper right scanning area, the lower left scanning area, and the lower right scanning area, respectively. By doing so, for example, the keyword "father" is added to the image data of the document scanned at the upper left scanning area, and the keyword "mother" is added to the image data of the document scanned at the upper right scanning area. Further, the keyword "brother" is added to the image data of the document scanned at the lower left scanning area, and the keyword "sister" is added to the image data of the document scanned at the lower right scanning area.

Figure 6:
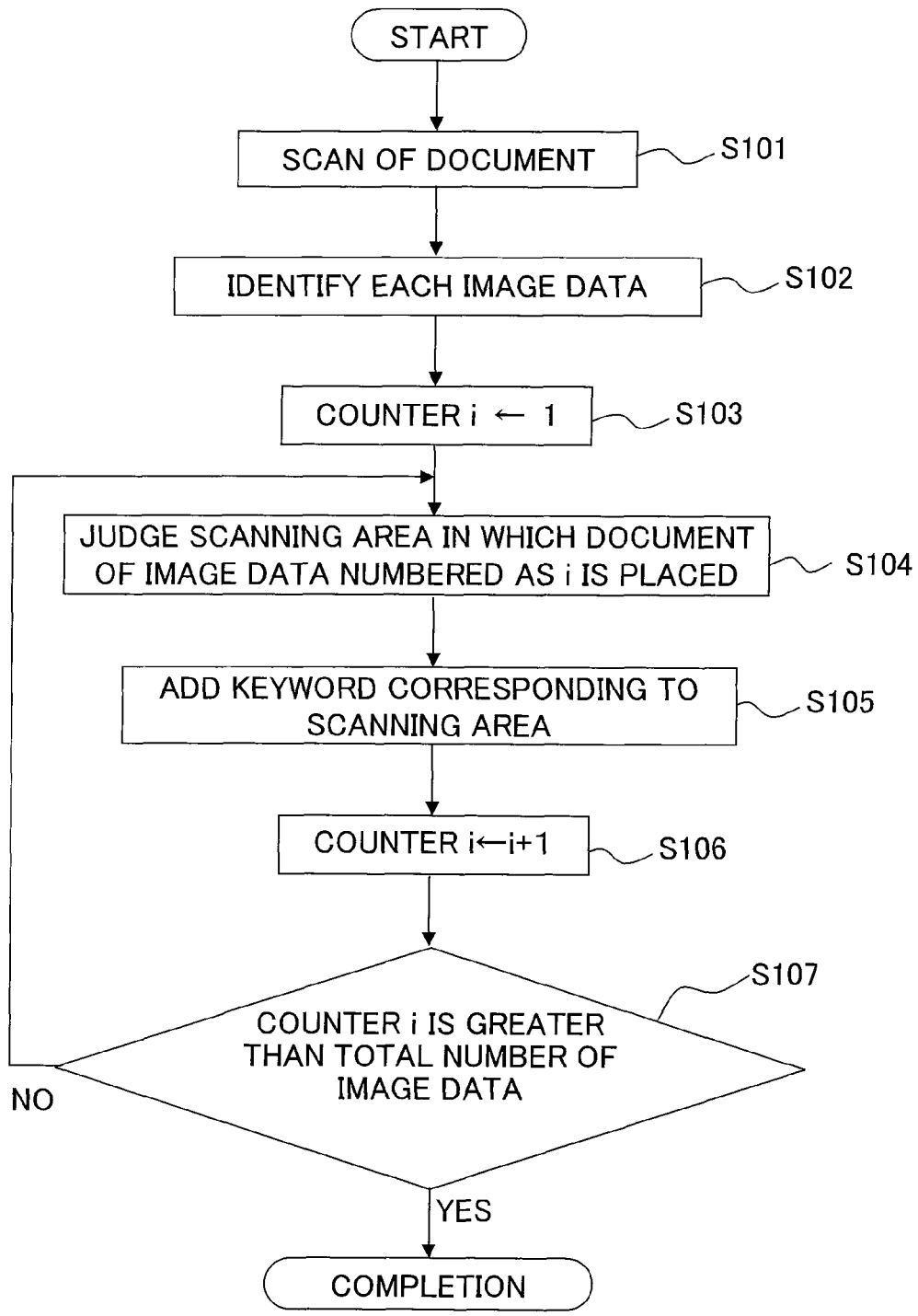
FIG. 6 is a flowchart showing a flow of a scan process in the first embodiment.

Next, an explanation will be made with reference to FIG. 6 about a scan process of the present invention. In this embodiment, the scan process using the flatbed type will be described.

At least one document is placed on the FB glass 8 and the operation panel 5 is operated by the user to start the scan process. Then, the image sensor 14 is moved in the subsidiary scanning direction and the image scanning section 6 scans the at least one document placed on the FB glass 8 as one image data by a single scan on the FB glass 8. The CPU 31 stores the one image data scanned by the image scanning section 6 in the RAM 33 (S101).

Next, the CPU 31 identifies at least one image data, which is scanned by the single scan and is based on the at least one document, from the one image data stored in the RAM 33. An identified at least one image data is numbered beginning at 1 to be stored in the RAM 33 (S102). For example, in a case that a plurality of documents are placed on the FB glass 8, the CPU 31 detects an end portion of each of the documents to identify each of the plurality of pieces of image data.

When each of the plurality of pieces of image data is numbered in the step S102, the CPU 31 stores in the RAM 33 a maximum number assigned to one of the plurality of pieces of image data, as a total number of the plurality of pieces of image data. Further, for each of the plurality of pieces of image data to which the number is assigned, the CPU 31 obtains an occupied rate indicating a percentage of each of the plurality of scanning areas in the image data, based on the number of pixels of the image data and the number of pixels of the image data in each of the plurality of scanning areas. The CPU 31 stores an obtained occupied rate in the RAM 33 while associating the obtained occupied rate with the image data.

The CPU 31 sets 1 in the counter i stored in the RAM 33 so as to initialize the counter i (S103). Subsequently, the CPU 31 judges that, the document corresponding to the image data, to which the same number as a value of the counter i is assigned, is scanned on which area of the plurality of scanning areas, based on the occupied rate stored in the RAM 33 (S104). In other words, the CPU 31 judges which areas of the plurality of scanning areas are overlapped with the document.

The CPU 31 adds the keyword(s) corresponding to all the scanning areas having the occupied rate other than zero to the image data to which the same number as the value of the counter i is assigned (S105). By performing this process, the CPU 31 associates the image data with the keyword. Then, the image data associated with the keyword is stored in the portable storage medium 39.

Further, the CPU 31 adds 1 to the counter i stored in the RAM 33 (S106) and judges whether or not the value of the counter i is greater than the total number of the image data stored in the RAM 33 (S107). In a case that the value of the counter i is greater than the total number of the image data (S107: Yes), the scan process is completed. On the other hand, the value of the counter i is not more than the total number of the image data (S107: No), the process is returned to the step S104, and the processes from the step S104 to the step S107 are repeated.

Figure 7:
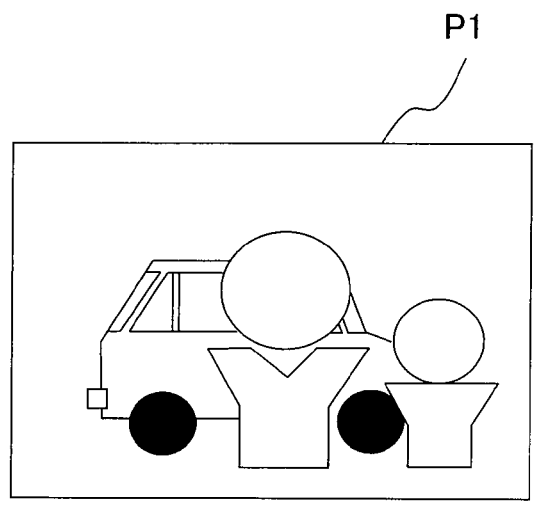
FIG. 7 shows a picture P1.
Figure 8:
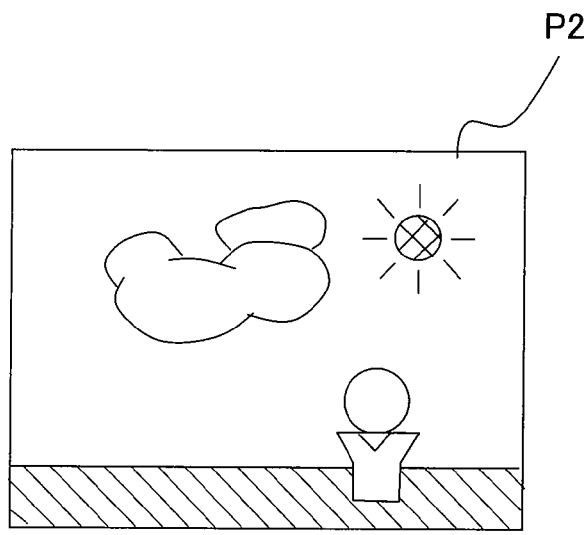
FIG. 8 shows a picture P2.
Figure 9:
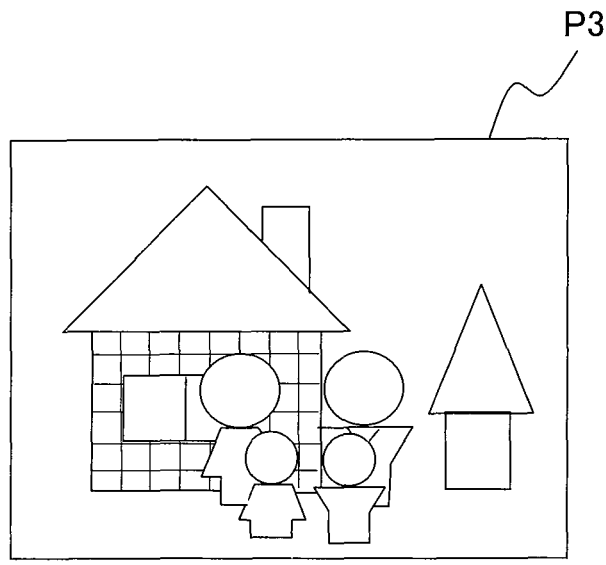
FIG. 9 shows a picture P3.
Figure 10:
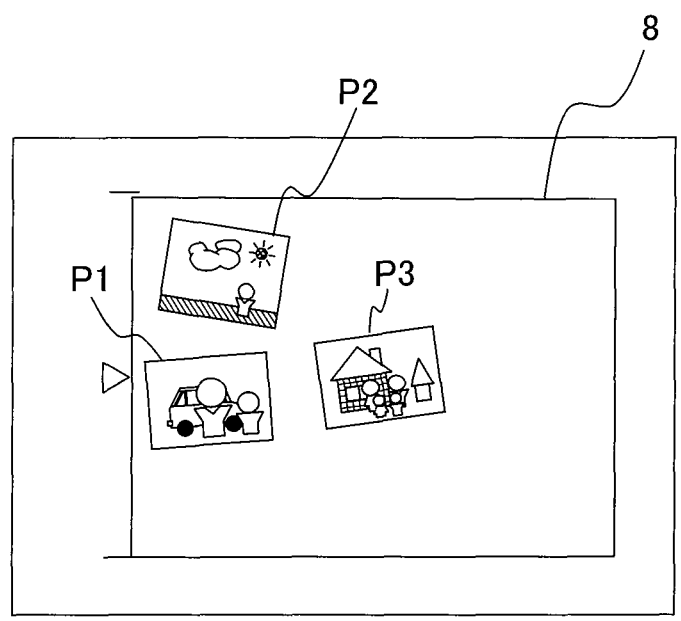
FIG. 10 shows an example of a state in which the pictures P1, P2, and P3 are placed on a FB glass in the first embodiment.

The above scan process will be explained below with a concrete example. For example, a consideration is made in relation to a case in which three pictures P1, P2 and P3 shown in FIGS. 7, 8, and 9 respectively are scanned and the keywords which is previously set by the user is added to the image data corresponding to each of the pictures. The picture P1 shown in FIG. 7 is a picture taken on a family trip and shows a father and a brother. The picture P2 shown in FIG. 8 is a picture also taken on the family trip and shows only the father. The picture P3 shown in FIG. 9 is a picture showing the family in front of their home and shows the father, a mother, the brother, and a sister. At first, in a case that the user places the three pictures P1, P2 and P3 shown in FIGS. 7, 8, and 9 on the FB glass as shown FIG. 10, the image scanning section 6 scans the three pictures P1, P2 and P3 as one image data by the single scan in the step S101 and temporarily stores the image data in the RAM 33.

Next, the CPU 31 detects the end portion of each of the pictures P1, P2 and P3 from the one image data stored in the RAM 33 to recognize the pictures P1, P2 and P3 one by one. Then, the CPU 31 stores in the RAM 33 three pieces of image data corresponding to the three pictures P1, P2 and P3, respectively.

In the S102, as shown in FIG. 11, a number "1" is assigned to the image data of the picture P1 shown in FIG. 7, a number "2" is assigned to the image data of the picture P2 shown in FIG. 8, and a number "3" is assigned to the image data of the picture P3 shown in FIG. 9. Further, when the number is assigned to each image data, the CPU 31 judges that the total number of the plurality of pieces of image data is "3", the plurality of pieces of image data being recognized from the one image data scanned in the step S101. Thus, the CPU 31 stores "3" as the total number of the plurality of pieces of image data stored in the RAM 33.

In a case that the user previously inputs the keywords in the keyword setting screen shown in FIG. 4 before the step S101, the keywords are associated with the plurality of scanning areas on the FB glass 8 respectively as shown in FIG. 5. Then, when the user places the pictures P1, P2 and P3 on the FB glass as shown FIG. 10, positions of the pictures P1, P2 and P3 with respect to the plurality of scanning areas become as shown in FIG. 12.

Figure 12:
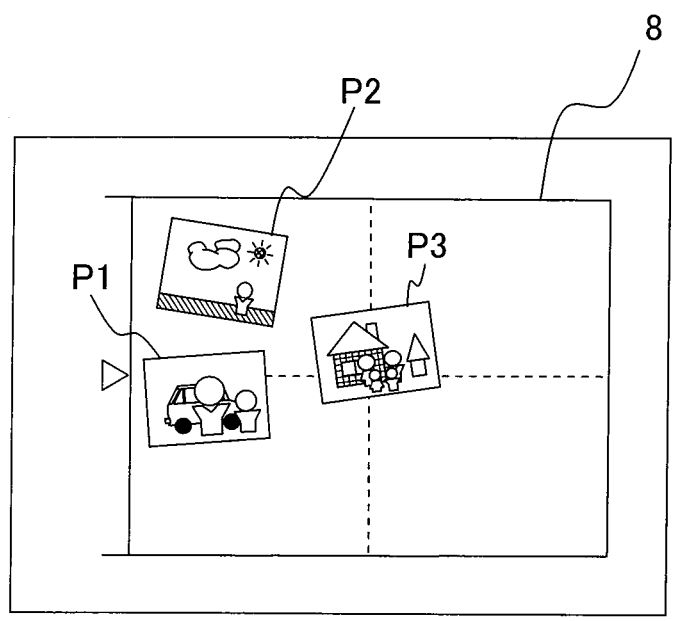
FIG. 12 shows positions of the pictures P1, P2, and P3 placed on the FB glass with respect to the divided scanning areas in the first embodiment.

In the steps S103 and S104, it is judged that 30 percent of the picture P1 corresponding to the image data numbered "1" is placed on (overlaps with) the upper left scanning area and 70 percent of the picture P1 is placed on (overlaps with) the lower left scanning area, as shown in FIGS. 11 and 12. In other words, it is judged that the picture P1 corresponding to the image data numbered "1" has overlapping portions which overlap with the upper left scanning area and the lower left scanning area respectively. Since the keyword corresponding to the upper left scanning area is the "father" and the keyword corresponding to the lower left scanning area is the "brother", two keywords of the "father" and the "brother" are added to the image data numbered "1" in the step S105. Note that since the image data numbered "1" corresponds to the picture P1 showing the father and the brother, a content of the image shown in the picture P1 corresponds with the content of the keywords added to the image data. For adding the keyword, it is allowable that the keywords are embedded in the image data, or a table in which the image data is associated with the keywords is made and stored.

After the keywords corresponding to all the scanning areas, on which the picture P1 is placed, are added to the image data numbered "1", 1 is added to the counter i in the step S106, and the keywords corresponding to all the scanning areas, on which the picture P2 is placed, are added to the image data numbered number "2" subsequent to the number "1" (S104 and S105). Then, the processes which are the same as or equivalent to those performed in the image data numbered "1" are repeated until the value of the counter i is greater than "3" which is the total number of the plurality of pieces of image data stored in the RAM 33 (from S104 to S107).

As shown in FIG. 12, 100 percent of the picture P2 corresponding to the image data numbered "2" is placed on the upper left scanning area. The keyword corresponding to the upper left scanning area is the "father" and the picture P2 is placed only on the upper left scanning area. Accordingly, only the keyword "father" is added to the image data numbered "2". Since the image data numbered "2" corresponds to the picture P2 showing only the father, the content of the image shown in the picture P2 corresponds with the content of the keyword added to the image data.

Also as shown in FIG. 12, 30 percent of the picture P3 corresponding to the image data numbered "3" is placed on the upper left scanning area, 45 percent of the picture P3 is placed on the upper right scanning area, 15 percent of the picture P3 is placed on the lower left scanning area, and 10 percent of the picture P3 is placed on the lower right scanning area. The keyword corresponding to the upper left scanning area is the "father", the keyword corresponding to the upper right scanning area is the "mother", the keyword corresponding to the lower left scanning area is the "brother", and the keyword corresponding to the lower right scanning area is the "sister". Thus, the four keywords "father", "mother", "brother", and "sister" are added to the image data numbered "3". Since the image data numbered "3" corresponds to the picture P3 showing the father, the mother, the brother, and the sister, the content of the image shown in the picture P3 corresponds with the content of the keywords added to the image data.

The keywords, as additional information, are added to the image data based on the position on the FB glass 8 at which the document (each of the pictures P1, P2, and P3 in this embodiment) is scanned by the image scanning section 6 of the scanner section 3. Accordingly, the user is capable of easily adding desired keywords to the image data of the document.

Further, the keywords are set to specific scanning areas. Thus, it is possible to raise a possibility that desired additional information are added to the image data.

Further, on the basis of the position on the FB glass 8 at which the document is scanned by the image scanning section 6 of the scanner section 3, it is possible to add, to the image data of the document, at least one keyword corresponding to at least one scanning area at which the document is placed. Accordingly, it is possible to add a plurality of different keywords to one image data of one document by the single scan.

Furthermore, it is possible to set different keywords to the plurality of scanning areas in the subsidiary scanning direction of the image scanning section 6 respectively. Thus, it is also possible to apply the present invention to the scanner section 3 in a FB type, which scans the image placed on the FB glass 8 while moving the image sensor 14 in the subsidiary scanning direction.

Moreover, even if the image scanning section 6 scans the plurality of documents by the single scan, it is possible to add the keywords to each of the image data of the plurality of documents. Accordingly, user-friendliness is improved.

Next, a second embodiment of an image forming apparatus of the present invention will be described. Since the structure and the electrical structure of the multifunction machine are common to those of the first embodiment, an explanation thereof is omitted here.

Also in the second embodiment, a scanning area on the FB glass 8 is divided into a plurality of scanning areas in a similar manner to that of the first embodiment. Keywords and file names for searching image data are set in a plurality of divided scanning areas respectively. FIG. 13 shows an example of a setting screen (setting UI) for setting the keywords and the file names.

A difference in a keyword setting between the first embodiment and the second embodiment is that a plurality of pieces of information set in the main scanning direction on the FB glass 8 belong to a category different from that of the pieces of information set in the subsidiary scanning direction on the FB glass 8. That is, it is possible to set file names in the main scanning direction on the FB glass 8 and to set the keywords in the subsidiary scanning direction on the FB glass 8. The file names and the keywords are examples of a plurality of pieces of additional information in different categories.

The user operates the input means, such as the keyboard, on the setting UI displayed on the display of the PC, to input the keywords and the file names in the plurality of scanning areas, in a similar manner to that of the first embodiment. For example, FIG. 13 shows a case in which the user inputs a file name "Life" in an upper scanning area in the main scanning direction; a file name "Trip" in a lower scanning area in the main scanning direction; a keyword "Adult" in a left scanning area in the subsidiary scanning direction; and a keyword "Child" in a right scanning direction in the subsidiary scanning direction.

Figure 14:
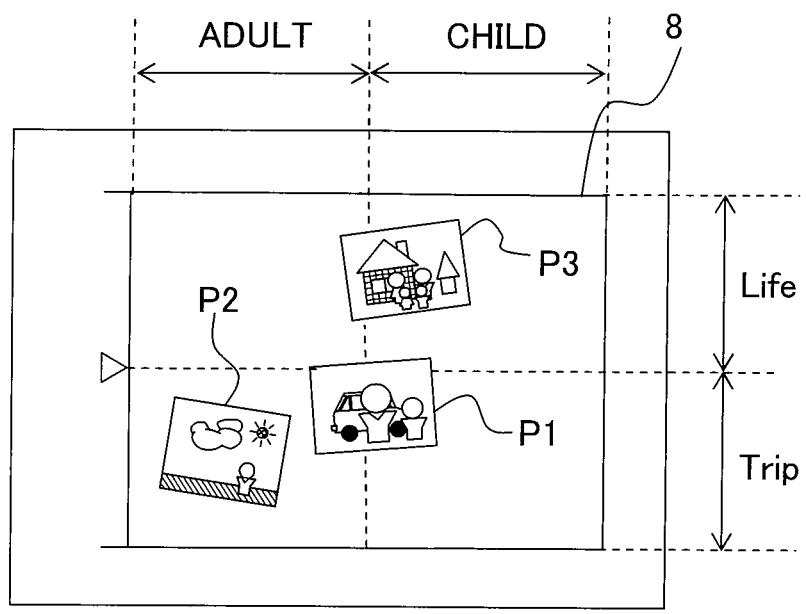
FIG. 14 shows positions of the pictures P1, P2, and P3 placed on the FB glass with respect to divided scanning areas in the second embodiment.

When the user inputs the file names and the keywords as shown in FIG. 13 and presses the "OK" button, the CPU 31 associates the file name "Life", the file name "Trip", the keyword "Adult", and the keyword "Child" with the upper scanning area, the lower scanning area, the left scanning area, and the right scanning area on the FB glass 8, respectively, as shown in FIG. 14. Then, the CPU 31 stores a plurality of pieces of position information of the scanning areas and the file names and the keywords associated with the plurality of pieces of position information in the RAM 33 via the network I/F 36.

Next, an explanation will be made about a scan process of the second embodiment. In this embodiment, features of the scan process different from those of the first embodiment will be explained with reference to FIGS. 14, 15, and 16, and an explanation of the features of the scan process, which are the same as or equivalent to those of the first embodiment, will be omitted appropriately.

In the steps S101 to S104, the processes which are the same as or equivalent to those of the first embodiment are performed. Following the step S104, the CPU 31 adds, at first, the file name corresponding to the scanning area in the main scanning direction having a maximum occupied rate, to the image data to which the same number as a value of the counter i is assigned (S201).

Next, the CPU 31 adds the keyword(s) corresponding to all the scanning areas in the subsidiary scanning direction having the occupied rate other than zero, to the image data to which the same number as the value of the counter i is assigned (S202). Then, the CPU 31 stores the image data to which the file name and the keyword(s) are added in the portable storage medium 39 and performs the scan process subsequent to the step S106 in a similar manner as that of the first embodiment. After the scan process is performed for all the image data in the RAM 33 as in the first embodiment, the scan process is completed.

The above scan process will be explained below with a concrete example. For example, a consideration is made in relation to a case in which three pictures P1, P2 and P3 shown in FIGS. 7, 8, and 9 respectively are scanned as in the first embodiment and the file name and the keyword, which are previously set by the user, are added to the image data corresponding to each of the pictures. At first, in a case that the user previously inputs the file names and the keywords on the keyword setting screen shown in FIG. 13, the file names and the keywords are respectively set in corresponding areas of the plurality of scanning areas on the FB glass 8 as shown in FIG. 14. When the user places the three pictures P1, P2 and P3 of FIGS. 7, 8, and 9 on the FB glass 8 as shown in FIG. 14, the image scanning section 6 scans the three pictures P1, P2 and P3 as one image data by the single scan in the step S101 and temporarily stores the image data in the RAM 33. In the step S102, the CPU 31 detects the end portion of each of the pictures P1, P2 and P3 from the one image data stored in the RAM 33 to recognize the pictures P1, P2 and P3 one by one. Then, the CPU 31 stores in the RAM 33 three pieces of image data corresponding to the three pictures respectively. In a similar manner as that of the first embodiment, the number "1" is assigned to the image data of the picture P1, the number "2" is assigned to the image data of the picture P2, and the number "3" is assigned to the image data of the picture P3 and the CPU 31 stores a plurality of pieces of numbered image data in the RAM 33. Then, the CPU 31 sets 1 in the counter i stored in the RAM 33 so as to initialize the counter i (S103).

Figure 15:
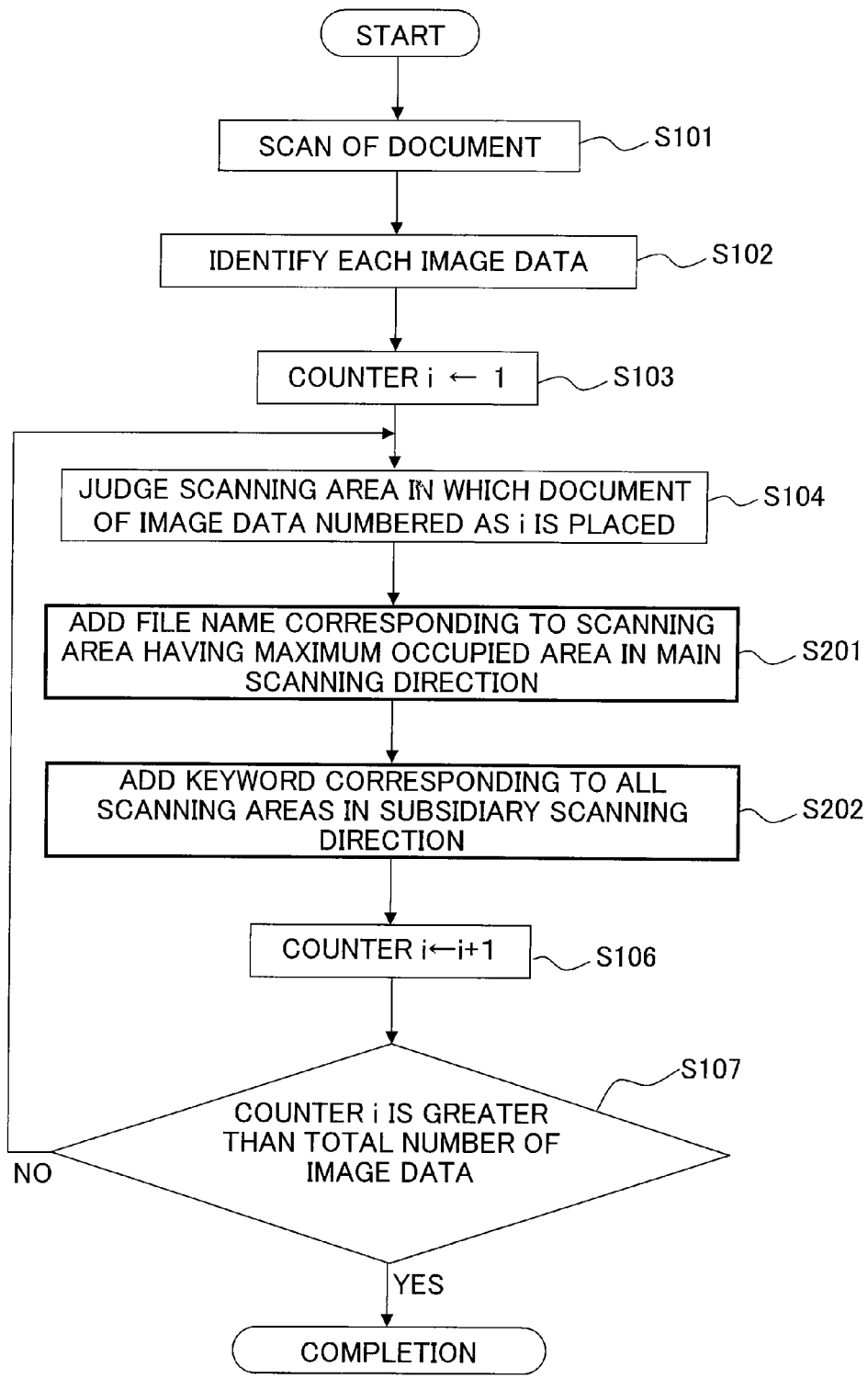
FIG. 15 is a flowchart showing a flow of a scan process in the second embodiment.

Next, in a case that the pictures P1, P2 and P3 are placed on the FB glass 8 as shown in FIG. 14, the CPU 31 judges that 15 percent of the picture P1 corresponding to the image data numbered "1" is placed on (overlaps with) the upper scanning area in the main scanning direction, 85 percent of the picture P1 is placed on the lower scanning area in the main scanning direction, 45 percent of the picture P1 is placed on the left scanning area in the subsidiary scanning direction, and 55 percent of the picture P1 is placed on the right scanning area in the subsidiary scanning direction, in the step S104 shown in FIG. 15. In the step S201, the CPU 31 judges that the scanning area in the main scanning direction having the maximum occupied rate is the lower scanning area. In other words, the CPU 31 judges that the picture P1 has overlapping portions which overlap with the upper scanning area and the lower scanning area respectively, and area of the overlapping portion overlapping with the lower scanning area is greater than that of the overlapping portion overlapping with the upper scanning area. Accordingly, the CPU 31 selects the file name "Trip" set in the lower scanning area, and adds a file name "Trip1.jpg" to the image data numbered "1". Further, in the step S202, the CPU 31 adds, the keywords corresponding to all the scanning areas in the subsidiary scanning direction having the occupied rate other than zero, that is, two keywords of the "Adult" and the "Child", to the image data numbered "1". Note that since the image data numbered "1" corresponds to the picture P1 showing the father and the brother, people shown in the picture P1 correspond with the content of the keywords added to the image data. Further, since the picture P1 is a picture taken on the family trip, a situation shown in the picture P1 corresponds with the file name.

In a case that the processes, which are the same as or equivalent to those performed for the image data numbered "1", are also performed for the image data numbered "2", it is judged that 100 percent of the picture P2 corresponding to the image data numbered "2" is placed on the lower scanning area in the main scanning direction and 100 percent of the picture P2 is placed on the left scanning area in the subsidiary scanning direction. Accordingly, the file name "Trip" set in the lower scanning direction in the main scanning direction is selected. However, a file name "Trip2.jpg", which has a number different from that of the file name of the image data numbered "1", is added so as not to add the same file name as the file name "Trip1.jpg" of the image data numbered "1". Further, in the step S202, the keyword "Adult" set in the left scanning direction in the subsidiary scanning direction is added. Since the image data numbered "2" corresponds with the picture P2 showing only the father, the content of the image in the picture P2 corresponds with the content of the keyword added to the image data. Further, since the picture P2 is a picture taken on the family trip, the situation shown in the picture P2 corresponds with the file name.

With respect to the image data numbered "3", it is judged that 100 percent of the picture P3 corresponding to the image data numbered "3" is placed on the upper scanning area in the main scanning direction, 20 percent of the picture P3 is placed on the left scanning area in the subsidiary scanning direction, and 80 percent of the picture P3 is placed on the right scanning direction in the subsidiary scanning direction. Accordingly, the file name "Life" set in the upper scanning area in the main scanning direction is selected and a file name "Life1.jpg" is added. Further, in the step S202, the keyword "Adult" set in the left scanning area in the subsidiary scanning direction and the keyword "Child" set in the right scanning area in the subsidiary direction are added. FIG. 16 shows a data list associated with a plurality of pieces of image data in the second embodiment. Since the image data numbered "3" corresponds with the picture P3 showing the father, the mother, the brother, and the sister, the content of the image in the picture P3 corresponds with the content of the two keywords added to the image data. Further, since the picture P3 is a picture taken in everyday life, the situation shown in the picture P3 corresponds with the file name. As such, the file name and the keywords are added for each image data, and the image data to which the file name and the keywords are added is stored in the portable storage medium 39.

It is highly possible that the file name corresponding to the scanning area having the maximum occupied rate is a file name desired by the user. Accordingly, in this embodiment, the file name corresponding to the scanning area in the main scanning direction having the maximum occupied rate is added for each image data.

A plurality of pieces of information set in the plurality of scanning areas in the main scanning direction of the image scanning section 6 belong to the category different from that of the plurality of pieces of information set in the plurality of scanning areas in the subsidiary scanning direction of the image scanning section 6. That is, it is possible to set the plurality of pieces of information belonging in the different categories for each of the scanning areas. Therefore, the user is capable of adding the plurality of pieces of information belonging in the different categories to the image data by the single scan.

Next, a third embodiment of an image forming apparatus of the present invention will be described. Since the structure and the electrical structure of the multifunction machine are common to those of the first embodiment, an explanation thereof is omitted here.

The third embodiment is an embodiment in which the present invention is applied to the scan in the ADF type using the ADF 7. In the third embodiment, a scanning area on the ADF glass 9 is divided into a plurality of scanning areas only in the main scanning direction and the keyword is set in each of the divided scanning areas. In other words, the scanning area on the ADF glass 9 is not divided in the subsidiary scanning direction.

Figure 17:
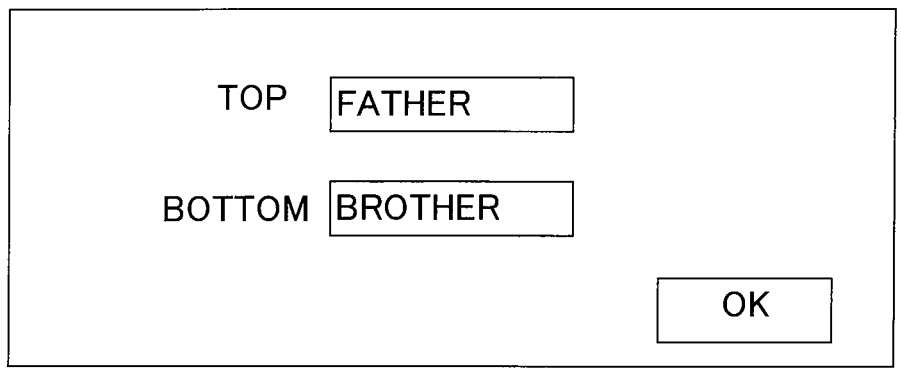
FIG. 17 shows an example of a keyword setting screen in a third embodiment.

The user operates the input means, such as the keyboard, on the setting UI displayed on the display of the PC, to set the keyword in each of the scanning areas divided in the main scanning direction. For example, the user inputs the "father" in an upper scanning area in the main scanning direction and the "brother" in a lower scanning area in the main scanning direction on the setting UI as shown in FIG. 17 and presses the "OK" button. By doing so, the "father" is set, as the keyword, in the upper scanning area in the main scanning direction and the "brother" is set, as the keyword, in the lower scanning area in the main scanning direction. The positions of the scanning areas and the keywords associated with the positions are stored in the RAM 33.

Figure 18:
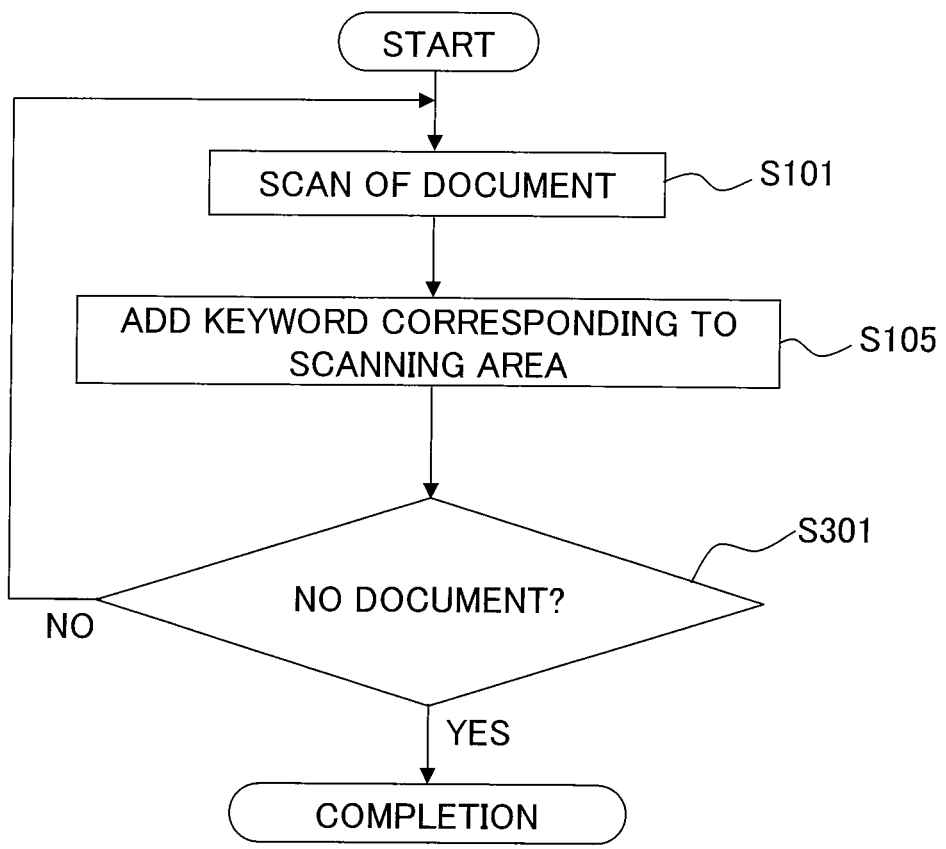
FIG. 18 is a flowchart showing a flow of a scan process in the third embodiment.

In the following, an explanation will be made below about features of the scan process of the third embodiment different from those of the scan process of the first and second embodiments with reference to a flowchart in FIG. 18. An explanation of the processes which are the same as or equivalent to those of the first and second embodiments will be omitted appropriately.

As shown in FIG. 19 or 20, when the user places a picture P1 as a document on the document tray 22 and operates the operation panel 5, the ADF 7 takes out the picture P1 placed on the document tray 22 in an arrow direction and feeds the picture P1 to a position facing the ADF glass 9. Then, the image scanning section 6 scans the picture P1 at the position facing the ADF glass 9 (S101).

Next, the CPU 31 adds the keyword, which is set in the scanning area, at which the image scanning section 6 scans the picture P1, to an image data of the picture P1 (S105) and judges whether or not another document is placed on the document tray 22 by detecting a value of a paper feeding sensor (S301). When another document is placed on the document tray 22 (S301: NO), the process is return to the step S101. On the other hand, when another document is not placed on the document tray 22 (S301: YES), the scan process is completed.

The above scan process will be explained below with a concrete example. When the picture P1 is placed on the document tray 22 such that the picture P1 is positioned at an upper position in the main scanning direction, in the step S105 of FIG. 18, the picture P1 fed by the ADF 7 is scanned at an upper half position on the ADF glass. Thus, a keyword "father" set in the upper scanning area in the main scanning direction is added to a piece of scanned image data of the picture P1.

Further, as shown in FIG. 20, when the picture P1 is placed on the document tray 22 such that the picture P1 is positioned at a lower position in the main scanning direction, the picture P1 fed by the ADF 7 is scanned at a lower half position on the ADF glass. Thus, a keyword "brother" set in the lower scanning area in the main scanning direction is added to the scanned image data of the picture P1.

The ADF 7 of this embodiment is capable of feeding and scanning the document in a case that the document is placed to be positioned at the upper or the lower position in the main scanning direction of the document tray 22. Further, in a case that the document which extends over a plurality of scanning areas is scanned, the keywords set in the plurality of scanning areas, over which the document is extended, are added. For example, in a case that the picture P1 is placed on the document tray 22 such that the picture P1 extends over the upper and lower positions in the main scanning direction, in FIG. 19 or FIG. 20, the keyword "father" set in the upper scanning area in the main scanning direction and the keyword "brother" set in the lower scanning direction in the main scanning direction are added to the image data of the picture P1.

In the third embodiment, different keywords are added to the plurality of scanning areas in the main scanning direction of the image scanning section 6 respectively. Thus, it is also possible to apply the present invention to the scanner section 3 in the ADF type, which feeds the document to scan the image without the movement of the image sensor 14 of the scanning section 6 in the subsidiary scanning direction.

Modified embodiments of the above embodiments will be described below.

In the block diagram in FIG. 3, a memory device such as a hard disk may be used to record the image data, without limiting to the RAM 33 and/or the NVRAM 34.

The additional information in the above embodiments includes the keywords and/or the file names. However, the additional information is not limited thereto. A piece of other additional information may be added. In particular, the additional information may be a date and time, a piece of information regarding a change of a destination for saving, a file-naming rule, etc. Further, the keywords and the file names are examples of the plurality of pieces of additional information belonging in different categories. However, the present invention is not limited thereto. The date and time, the information regarding the change of the destination for saving, the file-naming rule, etc., are also examples of the plurality of pieces of additional information belonging in the different categories.

It is assumed in the above embodiments that a document having a size smaller than that of the scanning area, such as the picture P1, is scanned. The present invention, however, is also applicable to a case in which a document having a size larger than that of the scanning area is scanned. In particular, in a case that the document having the size larger than that of the scanning area is scanned in the second embodiment, in which the file name corresponding to the scanning area in a main scanning direction having the maximum occupied rate is added, it is possible to obtain a greater effect. In the second embodiment, the keyword(s) set in all the scanning areas in the subsidiary scanning direction having the occupied rate other than zero is (are) added. However, it is also allowable to add the keyword set in the scanning area in the subsidiary scanning direction having the maximum occupied rate.

The above embodiments are embodiments in which the keywords set in the scanning area are added to the scanned image data of the document as the additional information. However, a scan operation may vary depending on the scanning areas. For example, it is allowable to set different types of scan operations, such as a color scan and a monochrome scan, in the plurality of divided scanning areas respectively. Further, it is also allowable to set different types of scan operations, such as a scan in which there is no magnification change and a scan, like an N in 1, in which there is a magnification change, in the plurality of divided scanning areas, respectively.

The above embodiments are embodiments in which the keywords set in the scanning area are added to the scanned image data of the document as the additional information. However, an operation performed after the scan operation may vary depending on the scanning areas. For example, in a case that a copy operation is performed, it is allowable to set different types of printing operations, such as a normal printing, an N in 1 printing, a booklet printing, etc., in the plurality of divided scanning areas, respectively. Further, it is also allowable to set a color used for printing, such as a full color, a mono-color, a black and white, etc., in each of the plurality of divided scanning areas. Furthermore, in a case that a fax operation is performed, it is allowable to set a destination etc. in each of the plurality of divided scanning areas.

The first embodiment of the present invention is an embodiment in which the scanning area on the FB glass 8 is divided into two scanning areas in the main scanning direction and is divided into two scanning areas in the subsidiary scanning direction, and thus the scanning area on the FB glass 8 is divided into four scanning areas. However, the present invention is not limited thereto. The scanning area may be divided in a direction other than the main scanning direction and the subsidiary scanning direction. For example, a diagonal line of the FB glass 8 may be used to divide the scanning area. Further, the scanning area may be divided into a plurality of areas other than four areas. It is allowable that the scanning area is not divided.

The first embodiment of the present invention is an embodiment in which the UI is displayed on the display of the PC (not shown) and the user operates the input means of the PC, such as the keyboard (not shown), on the UI, to input the keyword in each of the scanning areas. However, it is allowable that the UI is displayed on the display section 4 of the multifunction machine 1 and the user operates the operation panel 5 on the UI, to input the keyword in each of the scanning areas.

Figures 21, 22:
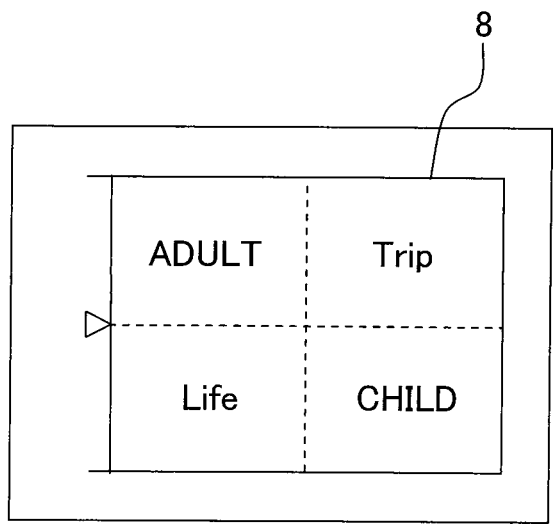
FIG. 21 shows a modified embodiment of the keyword setting screen in the first embodiment.
FIG. 22 shows a relationship between keywords and divided scanning areas in the modified embodiment of the first embodiment.

The first embodiment of the present invention is an embodiment in which the additional information belonging to a one category, such as the keywords shown in FIG. 5, is added. However, it is allowable to add the plurality of pieces of additional information belonging to different categories, such as the "keywords" and the "file names". For example, the user inputs keywords and file names corresponding to each of the scanning areas in the setting screen as shown in FIG. 21 via the input means of the PC, such as the key board, and presses the "OK" button. When the "OK" button is pressed, the CPU 31 associates the keyword or the file name set in the UI of FIG. 21 with the position information of each scanning area on the FB glass 8 as shown in FIG. 22 to store the position information of each scanning area and the keyword or the file name associated with the position information in the RAM 33 via the network I/F 36. In this case, the plurality of pieces of additional information set in adjacent scanning areas belong to different categories respectively. Accordingly, it is possible to reduce a fear that the plurality of pieces of additional information, which are set in the adjacent scanning areas and belong to the one category, interfere with each other to cause a contradiction in the additional information added to each image data. Thus, user-friendliness is improved.

In the second embodiment of the present invention, the file name set in the scanning area in the main scanning direction having the maximum occupied rate is added in the S201. However, it is allowable to add the file name set in the scanning area having the minimum occupied rate. Further, without limiting to the maximum or minimum occupied rate, it is also allowable to add the file name set in the scanning area in which the occupied rate has a specific value or a specific range.

In the step S105 of the first embodiment and the step S202 of the second embodiment, the keyword(s) set in all the scanning areas having the occupied rate other than zero is added. However, it is allowable to add the keyword(s) set in one or more scanning areas, which is selected by the selecting section, of all the scanning areas having the occupied rate other than zero. By doing so, it is possible to add the additional information set in a selected scanning area.

The above embodiments are embodiments in which the present invention is applied to the scanning apparatus. However, the present invention may be applied to a program which operates the information processing apparatus, such as the PC. An explanation will be made below about a case in which the present invention is applied to the program by which the information processing apparatus, such as the PC, performs the scan process shown in FIG. 6. At first, the CPU of the information processing apparatus such as the PC calls the program stored in the memory device such as the hard disk to perform the following processes. The CPU of the PC receives the image data scanned by the scanning apparatus in the step S101 of the first embodiment to store it in the memory device such as the hard disk. Next, the CPU of the PC identifies at least one image data, which is scanned by the single scan and is based on at least one document, from the image data stored in the hard disk. Then, at least one identified image data is numbered beginning at 1 to be stored in the hard disk (S102). Further, for each document, the CPU of the PC receives the information, in which the document is placed on which area of the scanning areas divided into four scanning areas as in the first embodiment, and judges the scanning area at which the document is scanned. The CPU of the PC adds the keyword(s) corresponding to all the scanning areas having the occupied rate other than zero to the image data (S105). Then, the CPU of the PC stores the image data associated with the keyword(s) in the hard disk.

A method for identifying each image data in the first and second embodiments of the present invention may be performed by detecting four corners and/or the end portion of each document.

The above embodiments are also applicable to a scanning system constructed of the scanning apparatus and the information processing apparatus. It is enough that the position information capturing section which captures the position information indicating the scanning position, at which the document is scanned by the scanning apparatus, is provided in any one of the scanning apparatus and the information processing apparatus.

What is claimed is:

1. An apparatus configured to scan a document, comprising:
    a scanning section having a scanning area and configured to scan the document in the scanning area, wherein the scanning area is divided into a plurality of divided scanning areas along a first direction and along a second direction intersecting the first direction;
    a control device configured to function as:
        a position information capturing section configured to capture position information indicating a position of the document on the scanning area when the document is scanned by the scanning section, and
        a processing section configured to perform a plurality of processes with respect to image data resulting from the scanning of the document by the scanning section, wherein the processing section is configured to perform one or more of the plurality of processes based on the position information captured by the position information capturing section, wherein the processes are divided into a plurality of categories; and
    a storage section storing one or more relationships between the divided scanning areas and the processes configured to be performed by the processing section,
    wherein adjacent divided scanning areas in the first direction are associated with one or more processes belonging to a first category of the categories, and adjacent divided scanning areas in the second direction are associated with one or more processes belonging to a second category different from the first category.

2. The apparatus according to claim 1, wherein the processing section includes an information adding section configured to add additional information to the image data.

3. The apparatus according to claim 1, wherein the control device is further configured to function as an area judgment section, the area judgment section configured to determine a divided scanning area, of the divided scanning areas, on which the document is placed, based on the position information captured by the position information capturing section,
    wherein the processing section is configured to perform a process, of the processes, associated with the divided scanning area determined by the area judgment section, based on the one or more relationships stored in the storage section.

4. The apparatus according to claim 3, wherein, when the area judgment section determines that the document overlaps a plurality of divided scanning areas, the processing section performs one or more processes associated with the divided scanning areas determined by the area judgment section to be overlapped by the document, based on the one or more relationships stored in the storage section.

5. The apparatus according to claim 4, wherein the control device is further configured to function as:
    a measuring section configured to measure areas of overlapping portions of the document, overlapping with the divided scanning areas respectively; and
    a selecting section configured to select the divided scanning area based on the areas of the overlapping portions measured by the measuring section,
    wherein the processing section performs the process associated with the divided scanning area selected by the selecting section.

6. The apparatus according to claim 5, wherein the selecting section is configured to select the divided scanning area based on the area of overlap between the document and the selected divided scanning area being the largest among the measured areas.

7. The apparatus according to claim 1, wherein the control device is further configured to function as an area judgment section configured to determine a divided scanning area, of the divided scanning areas, on which the document is placed, based on the position information captured by the position information capturing section,
    wherein the processing section is configured to perform processes associated with the divided scanning area determined by the area judgment section based on the relationship stored in the memory, wherein the processes belong to the first category and the second category, respectively.

8. The apparatus according to claim 3, wherein the scanning area is divided in a scanning direction in which the scanning section scans the document.

9. The apparatus according to claim 3, wherein the scanning area is divided in a sub scanning direction perpendicular to a scanning direction in which the scanning section scans the document.

10. The apparatus according to claim 1, wherein, when the scanning section scans a plurality of documents by a single scan, the processing section performs one or more processes of the plurality of processes with respect to image data resulting from the scanning of each of the documents by the scanning section.

11. An information processing apparatus connectable to a scanning apparatus, the information processing apparatus comprising:
    a processor; and
    memory storing instructions that, when executed by the processor, cause the information processing apparatus to:
        capture position information indicating a position of the document on a scanning area of the scanning apparatus when the document is scanned by the scanning apparatus, wherein the scanning area is divided into a plurality of divided scanning areas along a first direction and along a second direction intersecting the first direction; and
        perform a plurality of processes with respect to image data resulting from the scanning of the document by the scanning apparatus, wherein the information processing apparatus is configured to perform one or more of the plurality of processes based on the captured position information, wherein the processes are divided into a plurality of categories,
    wherein one or more relationships between the divided scanning areas and the processes configured to be performed by the processing section are stored, and wherein adjacent divided scanning areas in the first direction are associated with one or more processes belonging to a first category of the categories, and adjacent divided scanning areas in the second direction are associated with one or more processes belonging to a second category different from the first category.

12. A non-transitory machine readable medium storing instructions that, when executed by a processor, cause a scanning apparatus to:

capture position information indicating a position of a document on a scanning area of the scanning apparatus when the document is scanned, and perform a plurality of processes with respect to image data resulting from the scanning of the document by the scanning apparatus, wherein scanning apparatus is configured to perform one or more of the plurality of processes based on the captured position information, wherein the processes are divided into a plurality of categories; and wherein one or more relationships between the divided scanning areas and the processes configured to be performed by the processing section are stored, and wherein adjacent divided scanning areas in the first direction are associated with one or more processes belonging to a first category of the categories, and adjacent divided scanning areas in the second direction are associated with one or more processes belonging to a second category different from the first category.

13. A scanning system comprising:

a scanning apparatus having a scanning area and configured to scan a document in the scanning area, wherein the scanning area is divided into a plurality of divided scanning areas along a first direction and along a second direction intersecting the first direction;

an information processing apparatus connectable to the scanning apparatus;

a control device configured to function as:

a position information capturing section configured to capture position information indicating a position of the document on the scanning area when the document is scanned by the scanning section, and a processing section configured to perform a plurality of processes with respect to image data resulting from the scanning of the document by the scanning section, wherein the processing section is configured to perform one or more of the plurality of processes based on the position information captured by the position information capturing section, wherein the processes are divided into a plurality of categories; and a storage section storing one or more relationships between the divided scanning areas and the processes configured to be performed by the processing section, wherein adjacent divided scanning areas in the first direction are associated with one or more processes belonging to a first category of the categories, and adjacent divided scanning areas in the second direction are associated with one or more processes belonging to a second category different from the first category.

\* \* \* \* \*